United States Patent
Wang et al.

(10) Patent No.: US 7,767,621 B2
(45) Date of Patent: Aug. 3, 2010

(54) PROCESSES FOR REDUCING BEER SOLUBLE IRON IN DIATOMACEOUS EARTH PRODUCTS, DIATOMACEOUS EARTH PRODUCTS AND COMPOSITIONS THEREOF, AND METHODS OF USE

(75) Inventors: Qun Wang, Lompoc, CA (US); Timothy R. Smith, Lompoc, CA (US); Jeffrey D. Taniguchi, Santa Maria, CA (US)

(73) Assignee: World Minerals, Inc., Santa Barbara, CA (US)

( * ) Notice: Subject to any disclaimer, the term of this patent is extended or adjusted under 35 U.S.C. 154(b) by 0 days.

(21) Appl. No.: 12/438,931

(22) PCT Filed: Aug. 24, 2007

(86) PCT No.: PCT/US2007/076723

§ 371 (c)(1),
(2), (4) Date: May 28, 2009

(87) PCT Pub. No.: WO2008/024952

PCT Pub. Date: Feb. 28, 2008

(65) Prior Publication Data

US 2009/0264287 A1    Oct. 22, 2009

Related U.S. Application Data

(60) Provisional application No. 60/823,570, filed on Aug. 25, 2006.

(51) Int. Cl.
*B01J 20/14* (2006.01)
(52) U.S. Cl. .................. 502/412; 502/232; 502/240; 502/243; 502/250; 502/251; 502/252; 502/400; 502/407; 502/410; 210/656

(58) Field of Classification Search ................. 502/232, 502/240, 243, 250, 251, 525, 400, 407, 410, 502/412; 210/656
See application file for complete search history.

(56) References Cited

U.S. PATENT DOCUMENTS

| | | | |
|---|---|---|---|
| 4,508,742 A | 4/1985 | McLaughlin et al. |
| 4,563,441 A | 1/1986 | McLaughlin et al. |
| 4,965,084 A | 10/1990 | Austin et al. |
| 5,643,624 A | 7/1997 | Aldcroft et al. |
| 5,656,568 A | 8/1997 | Shiuh et al. |
| 6,555,151 B2 | 4/2003 | Hu et al. |
| 6,653,255 B2 | 11/2003 | Shiuh et al. |
| 2001/0023233 A1 | 9/2001 | Shiuh et al. |
| 2003/0170361 A1 | 9/2003 | Hu et al. |
| 2006/0157876 A1 | 7/2006 | Harris et al. |

FOREIGN PATENT DOCUMENTS

| | | |
|---|---|---|
| GB | 1 299 797 | 12/1972 |
| WO | WO 2008/024952 A2 | 2/2008 |

OTHER PUBLICATIONS

International Search Report and Written Opinion for PCT/US2007/076723, dated Feb. 2008.

*Primary Examiner*—Elizabeth D Wood
(74) *Attorney, Agent, or Firm*—Finnegan, Henderson, Farabow, Garrett & Dunner, L.L.P.

(57) ABSTRACT

Processes for preparing diatomaceous earth filter aids having a reduced beer soluble iron content, diatomaceous earth filter aids and compositions comprising the same, and methods for using the improved diatomaceous earth filter aids are disclosed herein. Further disclosed herein are processes for reducing beer soluble iron content by saturated steam treatment of a diatomaceous earth material in an enclosed vessel.

11 Claims, 5 Drawing Sheets

PROCESSES FOR REDUCING BEER SOLUBLE IRON IN DIATOMACEOUS EARTH PRODUCTS, DIATOMACEOUS EARTH PRODUCTS AND COMPOSITIONS THEREOF, AND METHODS OF USE

RELATED APPLICATIONS

This application is a 35 U.S.C. §371 national stage entry of, and claims the full benefits and rights of priority to, PCT International Application No. PCT/US2007/076723 filed Aug. 24, 2007, and claims the full benefits and rights of priority to U.S. Provisional Application No. 60/823,570 filed Aug. 25, 2006, all of which are incorporated herein by reference in their entireties.

DESCRIPTION OF THE INVENTION

1. Field of the Invention

Disclosed herein are diatomaceous earth products having a decreased beer soluble iron (BSI) content relative to feed products, processes for reducing the beer soluble iron content in diatomaceous earth, compositions comprising the diatomaceous earth products, and methods for using the same.

2. Background of the Invention

Diatomaceous earth products are obtained from diatomaceous earth, which is a sediment enriched in biogenic silica (i.e., silica produced or brought about by living organisms) in the form of siliceous frustules of diatoms. Diatoms are a diverse array of microscopic, single-celled golden brown algae of the class Bacillariophyceae, that possess an ornate siliceous skeleton (i.e., frustule) of varied and intricate structure comprising two valves that, in the living diatom, fit together much like a pill box.

In the field of filtration, many methods of particle separation from fluids employ diatomite products as filter aids. The intricate and porous structure unique to diatomite silica may be effective for the physical entrapment of particles in filtration processes. It is known to employ diatomite products to improve the clarity of fluids that contain suspended particles or particulate matter or exhibit turbidity.

In precoating, diatomite products may be applied to a filter septum to protect it, improve clarity, and expedite filter cake removal in filtration processes. In body feeding, diatomite is added directly to a fluid that is being filtered to increase flow rate and extend the filtration cycle. Depending on the requirements for the separation, the diatomite may be used both in pre-coating and/or in body feeding in the filtration system.

In addition to their advantageous filtration qualities, diatomaceous earth filter aids may also comprise iron that is soluble in beverages such as beer. When the filter aids are used to filter beverages, the iron may disassociate and enter the liquid, thereby adversely affecting the beverages' quality. For example, iron dissolved in beer may affect taste and shelf-life, and the brewery industry has long recognized the importance of reducing iron dissolution in beer and seeking out filter aids with increasingly lower beer soluble iron contents.

The brewing industry has developed at least two protocols by which the BSI of diatomaceous earth filter aids may be measured. The European Beverage Convention (EBC) promulgates a method wherein potassium hydrogen phthalate is contacted with the filter aid and subsequently analyzed for iron content. In the United States, the American Society of Brewing Chemists (ASBC) has set forth a method to measure the BSI content in parts per million, wherein a sample of BUDWEISER beer is contacted with the filter aid and the resulting iron content in the beer is measured.

In the ASBC method, for example, BSI content is measured by placing a 5 g sample of diatomite in 200 mL of decarbonated beer (for example, BUDWEISER, registered trademark of Anheuser-Busch) at room temperature, and the mixture is swirled intermittently for an elapsed time of 5 min and 50 sec. The mixture is then immediately transferred to a funnel containing 25 cm diameter filter paper, from which the filtrate collected during the first 30 sec is discarded. Filtrate is collected for the next 150 sec, and a 25 mL portion is treated with approximately 25 mg of ascorbic acid (i.e., $C_6H_8O_6$), to reduce dissolved iron ions to the ferrous (i.e., $Fe^{2+}$) state (thus yielding a "sample extract"). The color is developed by addition of 1 mL of 0.3% (w/v) 1,10-phenanthroline, and, after 30 min, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer.

In the EPC method, for example, a 10 g/L solution of potassium hydrogen phthalate (KHP) is used as the extractant with a total contact time of 2 hours. Extracts are then analyzed for iron concentration by the FERROZINE method.

Many methods have been developed to reduce the content of BSI in diatomite filter aids. One such method is crude diatomite filter aid selection. Some deposits of diatomaceous earth naturally contain less iron than diatomaceous earth material from deposits in other locations. Crude selection alone, however, may not be sufficient to supply the brewing industry with reduced BSI diatomaceous earth.

Another method that is known to reduce BSI content in diatomaceous earth is the process of calcination. Calcination is a technique wherein the diatomaceous earth is heated at a high temperature, for example in excess of 900° C. Calcination may reduce the presence of organics and volatiles in the diatomite and induce a color change from off-white to tan or pink.

Additionally, the beer soluble iron content of a diatomite filter aid may decrease naturally and gradually with time after calcination. Surface re-hydration by humidity in the ambient air, for example, is one mechanism of BSI reduction. To achieve BSI reduction naturally, however, may take months, and the results may fluctuate with seasons and crude selection.

Apart from or in addition to crude selection and calcination process control, certain chemicals may be applied to filter aids to reduce BSI content. However, water is the only chemical allowed by the U.S. Food and Drug Administration in the post-calcination process of filter aids used in food applications without being labeled as an additive.

Water treatment is also a known practice for reducing the BSI content in diatomaceous earth filter aids. Water treatment may comprise, for example, spraying water to the bottom of a bulk container comprising the filter aids or into bags during packaging. Water treatment at higher temperatures is known to accelerate the BSI reduction process, yet because water treatment generally occurs in an open container, the temperature of the treatment cannot be higher than the boiling point of water. Typical water treatments may include spraying and mixing water into a diatomite filter aid product while the product is hot (for example, at a temperature ranging from 150° F. to 200° F.). The treated product may be held in containers, such as bins and rail cars, until the BSI is reduced to the desired level. However, there still exists a need for reducing BSI efficiently and consistently in diatomaceous earth filter aids and/or reducing BSI to even lower levels than previously available.

SUMMARY OF THE INVENTION

Disclosed herein are processes for reducing the beer soluble iron content in diatomaceous earth. The processes may include providing a diatomaceous earth material and subjecting that diatomaceous earth material with an intensified water treatment, such as a saturated steam treatment, in an enclosed vessel.

Also disclosed herein are improved diatomaceous earth filter aids comprising a low beer soluble iron content. After processing, the improved diatomaceous earth filter aids show a reduction in iron, as measured by the ASBC, ranging from about 15% to about 90%, relative to the feed diatomaceous earth.

Further disclosed herein are filter aid compositions comprising the reduced BSI diatomite products disclosed herein. In various embodiments, the filter aid compositions may further comprise at least one additional filter aid. Exemplary filter aids may include at least one of expanded perlite, pumicite, natural glass, cellulose, activated charcoal, and clay. Moreover, the reduced BSI diatomaceous earth product disclosed herein may also be incorporated into compositions useful for applications other than filtration. For example, such compositions may include fillers, catalysts, chromatographic supports, support media, monolithic media, and aggregate media compositions.

Also disclosed herein are methods of using the improved diatomaceous earth filter aids. The improved diatomaceous earth filter aids may be used for pre-coating, in body feeding, or a combination of both pre-coating and body feeding.

It is to be understood that both the foregoing general description and the following detailed description are exemplary and explanatory only and are not restrictive of the invention, as claimed.

FIGURES

DETAILED DESCRIPTION OF THE INVENTION

Figure 1:
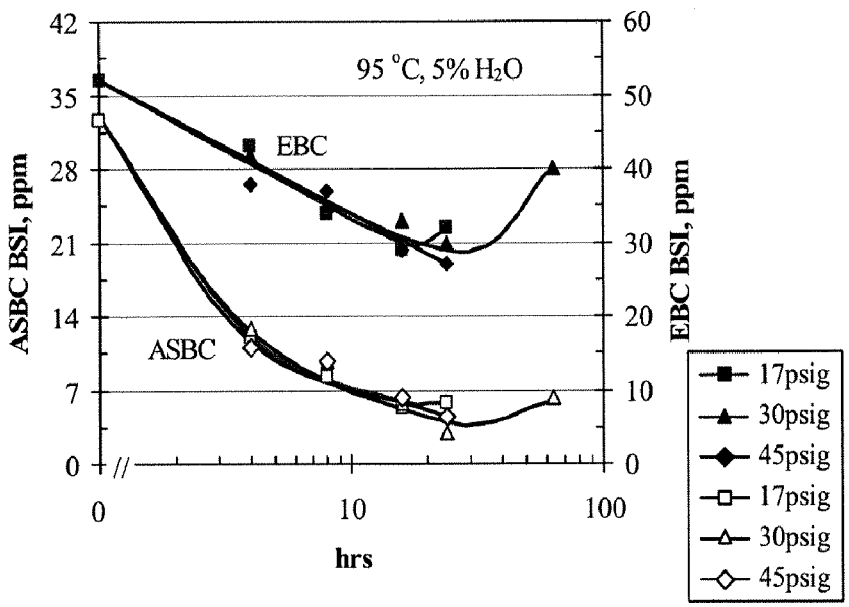
FIG. 1 shows a graph illustrating the effect of pressure on BSI reduction of Hyflo Super-Cel Z (Lompoc, Calif., USA).

As used herein, the term "beverage" refers to all beverages that tend to form haze upon chilling. Such beverages include, for example, vegetable-based juices, fruit juices, and malt-based liquids. Exemplary malt-based liquids include beer and wine.

As used herein, the term "beer" refers to a beverage brewed from malt, flavored with hops, and often fermented. Suitable beer beverages include, for example, ales, lagers, pilsners, Dortmund beers, Munich beers, stouts, and non-alcoholic beers or near beers.

As used herein, the term "beer soluble iron" is interchangeable with the acronym "BSI" and refers to the iron content, which may be measured in parts per million, of a diatomaceous earth filter aid that dissociates in the presence of beverages, such as beer. The BSI may also be measured in beverages in addition to beer, and thus, BSI may also refer to "beverage soluble iron."

As used herein, the term "saturated steam" refers to steam that is at least at the boiling point temperature corresponding to the surrounding pressure. Moreover, the term "saturated steam" also refers to steam containing water that is held in suspension mechanically, and the term may be interchangeable with the terms "wet steam" and "misty steam."

One embodiment disclosed herein is a process comprising providing a diatomaceous earth material and subjecting the diatomaceous earth material to a saturated steam treatment in an enclosed vessel.

In another embodiment, saturated steam treatment may comprise mixing a diatomaceous earth material with water and heating the mixture in an enclosed vessel to initiate phase transfer of the water to saturated steam.

The use of saturated steam may achieve several treatment goals. When water is applied to diatomaceous earth in a gas phase, it overcomes surface tension, which limits the surface wetting of the diatomaceous earth that is observed in conventional water treatment. Moreover, as condensation occurs and the steam converts to water, the consequent energy transfer may also contribute energy to accelerate the hydration of the diatomaceous earth. Accordingly, the temperature of the diatomaceous earth must not reach too high a level, as condensation would then not occur. Water condensed in the saturated steam may remain in contact with the surfaces of the diatomaceous earth, limiting dehydration that may occur as the surface temperature increases.

Heating may be performed by any suitable technique known in the art. For example, heating may comprise providing heat generated by an oven, direct fired combustion equipment, and/or indirect fired combustion equipment. An oven may include a convection oven or a conventional oven.

Suitable amounts of water may range from about 0.1% to about 10%, from about 1% to about 9%, from about 3% to about 7%, or from about 4% to about 6%, by weight relative to the total weight of the diatomaceous earth. In further embodiments, the water may comprise about 1%, about 2%, about 3%, about 4%, or about 5%, by weight relative to the total weight of the diatomaceous earth.

To ease the energy requirements of heating, the temperature of the water may be elevated before it is contacted with the diatomaceous earth so that less energy is required to initiate phase transfer. Thus, the temperature of the water added may be up to about 99° C. at atmospheric pressure.

The water may be deionized water or ultrapure water. Moreover, the water may be treated to remove or decrease any metals, toxins, and other undesirable elements before it is contacted with the diatomaceous earth. In one embodiment, the water does not include additives, for example, salt or other non-volatile components, that may raise the boiling point of the water.

The pressure under which the steam treatment takes place may be at least about atmospheric pressure. In certain embodiments, the pressure ranges from about 29 psig to about 70 psig, such as from about 30 psig to about 68 psig or from about 40 psig to about 55 psig.

In one embodiment, the diatomaceous earth may be directly contacted with saturated steam. In other embodiments, the diatomaceous earth may be indirectly contacted with saturated steam.

The temperature and pressure combinations contribute to improved kinetics of the process disclosed herein. In certain embodiments disclosed herein, the time period for reduction of BSI may be less than about 24 hours, such as less than about 12 hours, less than about 6 hours, less than about 5 hours, less than about 4 hours, less than about 3 hours, less than about 2 hours, less than about 1 hour, or less than about 30 minutes.

The processes disclosed herein may further comprise mixing the diatomaceous earth materials with additional water to facilitate reduction of the BSI. In certain embodiments, the additional water may provide a source of the steam used to hydrate the diatomaceous earth. Alternatively, the additional water may be used to create an aqueous slurry of diatomaceous earth material that is subsequently heated with saturated steam.

Suitable amounts of additional water may range from about 0.1% to about 10%, such as from about 1% to about 9%, from about 3% to about 7%, or from about 4% to about 6%, by weight relative to the total weight of the diatomaceous earth. In further embodiments, the amount of additional water may range from about 1%, about 2%, about 3%, about 4%, or about 5%, by weight relative to the total weight of the diatomaceous earth. The temperature of the additional water may be at least about room temperature (about 20° C.), but less than the boiling point of the steam.

In another embodiment, the diatomaceous earth material is indirectly heated with saturated steam. For example, the steam may contact the outer surface of the enclosed vessel in which the diatomaceous earth is contained.

In one embodiment, the vessel is a tray in which the diatomaceous earth is arranged in a layer. The thickness of the layer may be about 1 inch thick or less, such as about 0.5 inches or less.

In certain embodiments, the temperature ranges from about 100° C. to about 140° C., such as from about 105° C. to about 125° C. or from about 125° C. to about 135° C.

The diatomaceous earth material used as feed materials for the processes disclosed herein may comprise commercially available diatomaceous earth products. Suitable diatomaceous earth products may include natural, calcined, and flux-calcined products. Thus, the processes and resulting diatomaceous earth filter aids and compositions may be tailored to a particular application by, in part, the selection of the feed material. For example, certain natural diatomaceous earth feed material may undergo minimal processing following mining. Natural diatomaceous earth may be milled, dried, and/or air classified before undergoing BSI reduction. Calcined diatomaceous earth products, which are also called pinks, are heat treated natural diatomaceous earth products. Flux-calcined diatomaceous earth products are those calcined products that are heated in the presence of a flux, such as a fusible alkali salt. In yet another embodiment, the diatomaceous earth feed material may be raw product extracted from the earth without any subsequent processing.

Subsequent to or prior to the BSI reduction, the diatomaceous earth material may undergo additional processing steps. For example, the powder size of the diatomaceous earth material may be adjusted to a suitable size using techniques known in the art. For example, the diatomaceous earth material may undergo mechanical separation to adjust the powder size distribution. Numerous separation techniques are known to the skilled artisan including, without limitation, screening, extrusion, triboelectric separation, liquid classification, and air classification. The diatomaceous earth material may also undergo additional milling and/or grinding to reduce the powder size.

In one embodiment, the processes described herein further comprise incorporating the diatomaceous earth material that has been processed to reduce BSI content into a filter aid composition comprising at least one additional filter aid media. Suitable media to be combined with the diatomaceous earth material include at least one of unimproved diatomaceous earth, expanded perlite, pumicite, natural glass, cellulose, activated charcoal, and clay. The filter aid compositions may be formed into sheets, pads, cartridges, or monolithic or aggregate media capable of being used as supports or substrates. Considerations in the manufacture of filter aid compositions may include total BSI of the composition, median BSI of the composition, particle size distribution, pore size, costs, availability, and the like.

In yet another embodiment, the processes disclosed herein comprise incorporating the diatomaceous earth material that has been processed to reduce BSI content into a filler composition, a catalyst composition, or other end use compositions.

Also disclosed herein is a novel diatomaceous earth material having a decreased BSI content relative to natural, calcined, and flux-calcined diatomaceous earth. Since the selection of the crude diatomaceous earth materials may affect the total BSI, it may be useful to view the improved reduction in BSI in terms of percent reduction. For example, the percent reduction in ASBC BSI may range from about 15% to about 90% relative to the feed material. For diatomaceous earth processed from natural diatomaceous earth feed materials, the percent reduction, as measured by the ASBC protocol, may range from about 60% to about 90%, such as from about 70% to about 85% or from about 75% to about 80%, relative to the feed material. The EBC reduction of BSI for natural diatomaceous earth products may range from about 10% to about 60%, such as from about 40% to about 55%, from about 10% to about 25%, or from about 20% to about 45%, relative to the feed material.

For diatomaceous earth processed from calcined diatomaceous earth feed materials, the reduction in ASBC BSI may range from about 55% to about 75%, such as from about 60% to about 70% or from about 63% to about 67%, relative to the feed material. The reduction in BSI measured according to the EBC protocol for diatomaceous earth processed from calcined diatomaceous earth feed materials may range from about 25% to about 40%, such as from about 30% to about 35%, relative to the feed material.

For diatomaceous earth processed from flux-calcined diatomaceous earth feed materials, the reduction in ASBC BSI may range from about 15% to about 40%, such as from about 20% to about 35% or from about 25% to about 30%, relative to the feed materials.

The improved diatomaceous earth filter aids disclosed herein may be employed in filtration applications, such as in porous filtration media. In certain embodiments, the diatomaceous earth filter aids disclosed herein may be applied to a filter septum to protect it and to improve clarity of the liquid to be filtered in filtration processes. In another embodiment, the improved diatomaceous earth filter aids may be added directly to a beverage to be filtered to increase flow rate and extend the filtration cycle. In other embodiments, the improved diatomaceous earth filter aids may be used as pre-coating, in body feeding, or a combination of both pre-coating and body feeding.

In one embodiment, the method of filtering comprises providing the improved diatomaceous earth filter aid disclosed herein, pre-coating a filter element with the improved diatomaceous earth filter aid, and contacting a beverage to be filtered with the coated filter element. The contacting may comprise passing the beverage through the filter element.

In another embodiment, the method of filtering comprises suspending the improved diatomite filter aid disclosed herein in a beverage containing particles to be removed from the beverage and subsequently separating the diatomaceous earth filter aid from the filtered beverage.

The improved diatomaceous earth filter aids disclosed herein may be used in conjunction with other filtering media to achieve further improved filtration. Suitable media that may be combined with the diatomaceous earth filter aids disclosed herein include at least one of expanded perlite, pumicite, natural glass, cellulose, activated charcoal, and clay. The filter aid compositions may be formed into sheets, pads, cartridges, or monolithic or aggregate media capable of being used as supports or substrates.

The improved diatomaceous earth products disclosed herein may also be used in applications other than filtration. For example, the diatomaceous earth products disclosed herein may be used as composites used in filler applications. For example, they may be used to alter the appearance and/or properties of paints, enamels, lacquers, and related coatings and finishes. The products may also be used, for example, in paper formulations and paper processing applications, to provide antiblock and/or reinforcing properties to polymers, as abrasives, for buffing, and/or as polishing compositions. The diatomaceous earth filter aids disclosed herein may also be used in the processing and preparation of a variety of catalysts, as chromatographic supports, and as other support media. In such other applications, the diatomaceous earth products may be blended with other ingredients to make monolithic or aggregate media useful as supports (for example, for microbe immobilization), substrates (for example, for enzyme immobilization), or in the preparation of catalysts.

Unless otherwise indicated, all numbers expressing quantities of ingredients, reaction conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXAMPLES

Materials

Samples of Standard Super-Cel (STD), Standard Super-Cel Z (STD Z), Hyflo Super-Cel (HYF) and Hyflo Super-Cel Z (HYF Z) were obtained from the Lompoc, Calif., USA powder mill plant of World Minerals Inc. (Santa Barbara, Calif., USA). Also obtained was an in-process sample of Celite 3Z (C3Z) taken before water treatment. The samples of STD, STD Z, HYF, and HYF Z had been aged 6 to 78 days, and were 6 weeks to 23 weeks old at the time the following tests were conducted, as shown in Table I. The C3Z sample was obtained fresh and, at the end of the tests described below, was less than 3 weeks old.

Table I lists BSI data on the samples, which were analyzed without further processing at the beginning and the end of the tests described below. It can be seen from Table I that there was no significant decrease in the ASBC BSI of STD and STD Z (pink grades). ASBC BSI of HYF and HYF Z (flux-calcined grades) was reduced. EBC BSI of all samples either increased or decreased slightly, which may be a result of analytical and/or experimental error.

TABLE I

Lompoc diatomite filter aid samples

| Grade | Production Date | BSI analysis Date | Sample age | BSI, ppm ASBC | EBC |
|---|---|---|---|---|---|
| STD | Feb. 09, 2005 | Mar. 14, 2005 | 33 days | 26 | 73 |
|  |  | Aug. 29, 2005 | 201 days | 24 | 77 |
| STD Z | Jan. 02, 2005 | Mar. 21, 2005 | 78 days | 12 | 57 |
|  |  | Aug. 29, 2005 | 239 days | 11 | 64 |
| HYF | Mar. 08, 2005 | Mar. 14, 2005 | 6 days | 52 | 72 |
|  |  | Aug. 29, 2005 | 174 days | 45 | 76 |
| HYF Z | Feb. 11, 2005 | Mar. 14, 2005 | 30 days | 33 | 52 |
|  |  | Aug. 29, 2005 | 198 days | 24 | 49 |
| C3Z untreated | Jul. 25, 2005 | Jul. 26, 2005 | 1 day | 27 | 72 |

Treatment Methods

Two treatment methods were employed, the Parr reactor method and the steam sterilizer method. The Parr reactor method utilized a 600-ml and 2.5 inch-ID steel cylinder of a Parr pressure reactor. The reactor's agitator was removed, and an air inlet/outlet valve was attached. The reactor was preheated in an oven at a predetermined temperature. A 100 g sample of diatomite mixed with water was added to the preheated reactor, and the reactor was sealed and returned to the oven. The reactor may be pressurized with compressed air before being put into the oven.

The temperature of the oven chamber was reported as the temperature of the water treatment, and the total pressure inside the reactor at the temperature was calculated by adding the steam partial pressure (Table II) and the air partial pressure. The air partial pressure was calculated based on the equation of state for an ideal gas, as follows:

$$P(\text{psig}) = P_{Steam}(\text{psi}) + [P_{Air,21C}(\text{psig}) + 14.7] * [273 + T(°C.)]/(273 + 21) - 14.7$$

wherein P is the total gauge pressure,
$P_{Steam}$ is steam partial pressure,
$P_{Air,21C}$ is air gauge pressure measured at 21° C., and
T is the water treatment temperature.

TABLE II

| | Steam partial pressure according to steam table | | | | | |
|---|---|---|---|---|---|---|
| °C. | 95 | 105 | 115 | 125 | 135 | 145 |
| psi | 12.3 | 17.5 | 24.5 | 33.7 | 45.4 | 60.3 |

In the steam sterilizer method, a Model 16-D-24-PB steam sterilizer (Consolidated Stills & Sterilizers, Boston, Mass., USA) was used. In certain tests, a sample of diatomaceous earth powder, with or without having been mixed with water, was placed in a glass dish to form a loose and flat layer. The dish was covered with either an aluminum dish or a screen to allow steam to directly contact the powder and to prevent dripping of condensed water onto the powder. In the remainder of the tests, a sample was compressed into a glass Petri dish, and the dish was placed upside down in a larger dish to prevent steam from directly contacting the sample. In all tests, the sample dish was then placed in the sterilizer chamber and heated by steam to a chamber pressure of about 32 psig (47 psi) for varying periods of time.

BSI Analyses from the Parr Reactor Method

At the end of both the Parr reactor treatment method and the steam sterilizer treatment method, the treated diatomaceous earth sample was transferred to a plastic bag, sealed, and subsequently analyzed for BSI on the second day or soon thereafter. Two BSI analytical methods were employed. In a method adopted from the American Society of Brewing Chemists (ASBC) protocol, BUDWEISER beer (Anheuser-Busch Inc., St. Louis, Mo., USA) was used as the extractant with a total contact time of 9 minutes.

The other method, based on the European Brewery Convention (EBC) protocol, utilized a 10 g/L solution of potassium hydrogen phthalate (KHP) as the extractant with a total contact time of 2 hours. Extracts were analyzed for iron.

1. Lompoc, Calif. Hyflo Super-Cel Z

Figure 2:
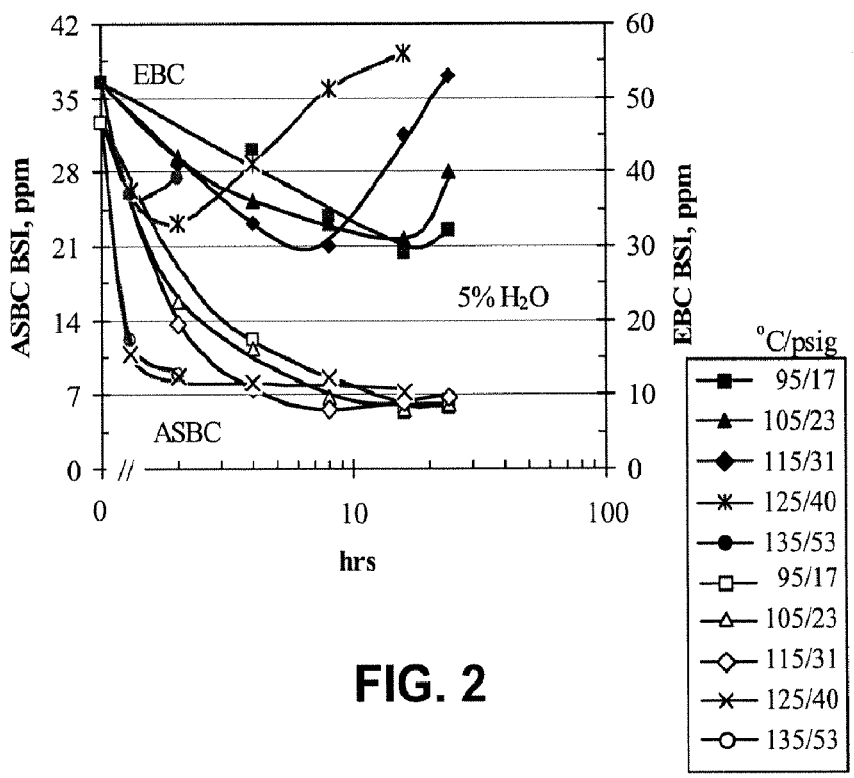
FIG. 2 shows a graph illustrating the effect of temperature on BSI reduction of Hyflo Super-Cel Z (Lompoc, Calif., USA).
Figure 3:
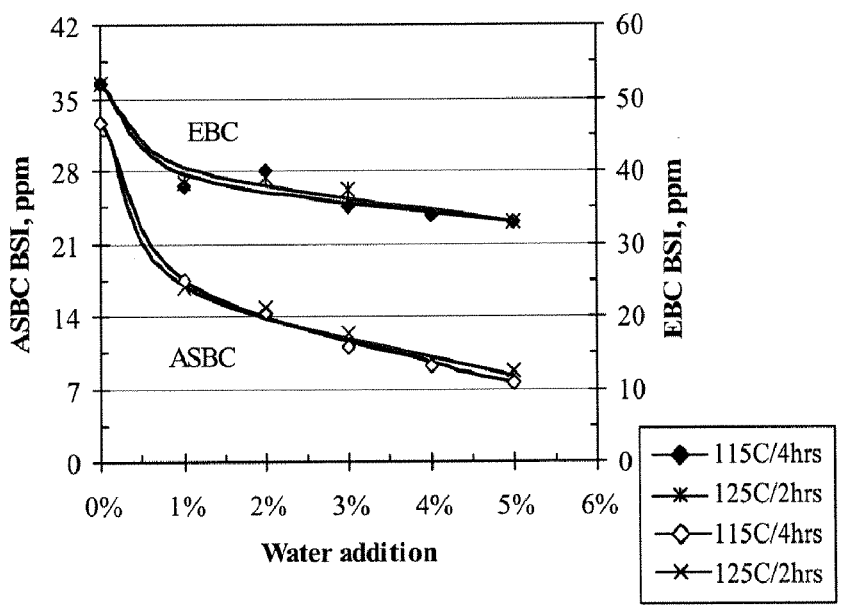
FIG. 3 shows a graph illustrating the effect of water addition on BSI reduction of Hyflo Super-Cel Z (Lompoc, Calif., USA).

FIGS. 1, 2, and 3 present results obtained with the HYF Z sample treated via the Parr reactor method. At 95° C., a BSI of about 5 ppm (ASBC) or 30 ppm (EBC) was reached, taking a total time of 24 hours (FIG. 1). As shown in FIG. 1, elevating the pressure without increasing the temperature did not significantly impact the results. Increasing the temperature, however, accelerated the BSI reduction process. As shown in FIG. 2, a significant BSI reduction was reached in two hours. Pressure increased as the temperature increased in the enclosed cylinder, thereby preventing moisture loss When the BSI was measured according to the EBC protocol, the BSI initially decreased; however, as treatment progressed, an elevated BSI was observed. See FIG. 2. As the temperature increased, the time period required to reach the minimum EBC BSI value decreased. A similar trend did not exist when the BSI was measured according to the ASBC protocol.

FIG. 3 demonstrates the effect of BSI with a change in the percentage of water added to the diatomaceous earth, while holding temperature constant. As shown in FIG. 3, at temperatures of 115° C. and 125° C., the BSI decreased as the percentage of water added increased.

2. Lompoc, Calif. Standard Super-Cel Z

Figure 4:
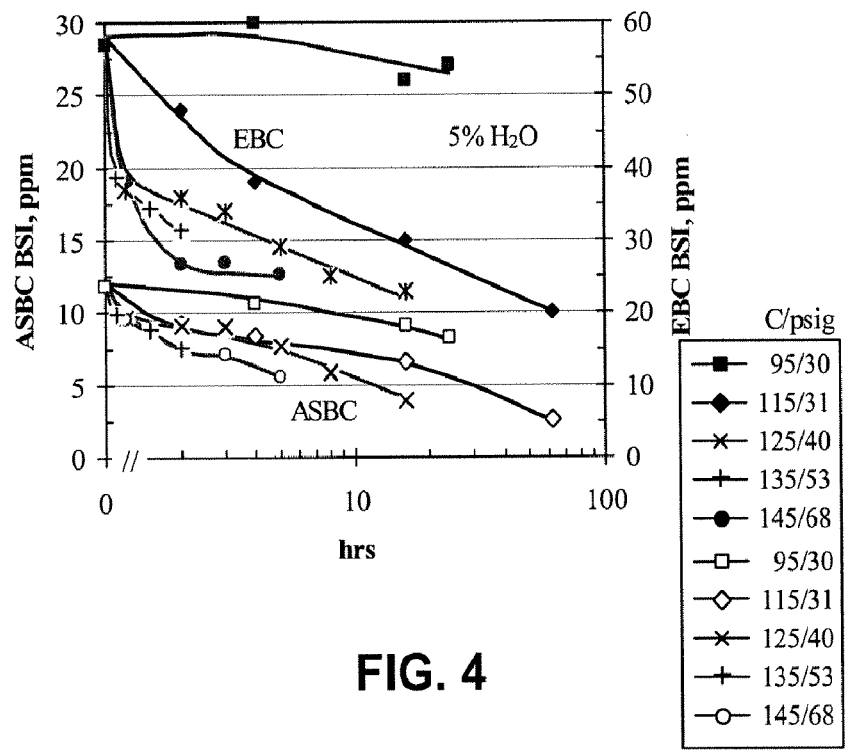
FIG. 4 shows the effect of temperature on BSI reduction of Standard Super-Cel Z (Lompoc, Calif., USA).
Figure 5:
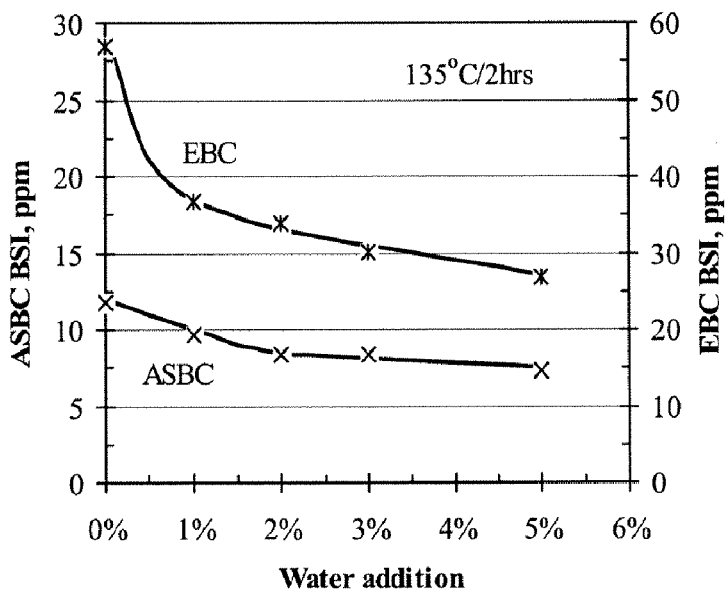
FIG. 5 shows the effect of water addition on BSI reduction of Standard Super-Cel Z (Lompoc, Calif., USA).

FIGS. 4 and 5 illustrate the effect of temperature increases and water addition on a STD Z sample treated according to the Parr reactor method. Similar to the temperature effects observed in the HYF Z material, increasing the temperature accelerated the BSI reduction process. For example, treating the STD Z sample at 135° C. for 2 hours yielded an ASBC BSI reduction from 12 ppm to 7 ppm and an EBC BSI from 57 ppm to 27 ppm (FIG. 4).

Unlike the trends observed in the HYF Z testing, a minimum EBC BSI reduction kinetic was not observed. The amount of water addition, however, affected the amount of BSI reduction to a lesser degree in the case of ASBC BSI as compared to HYF Z (FIG. 5).

3. Lompoc, Calif. Celite 3Z

Figure 6:
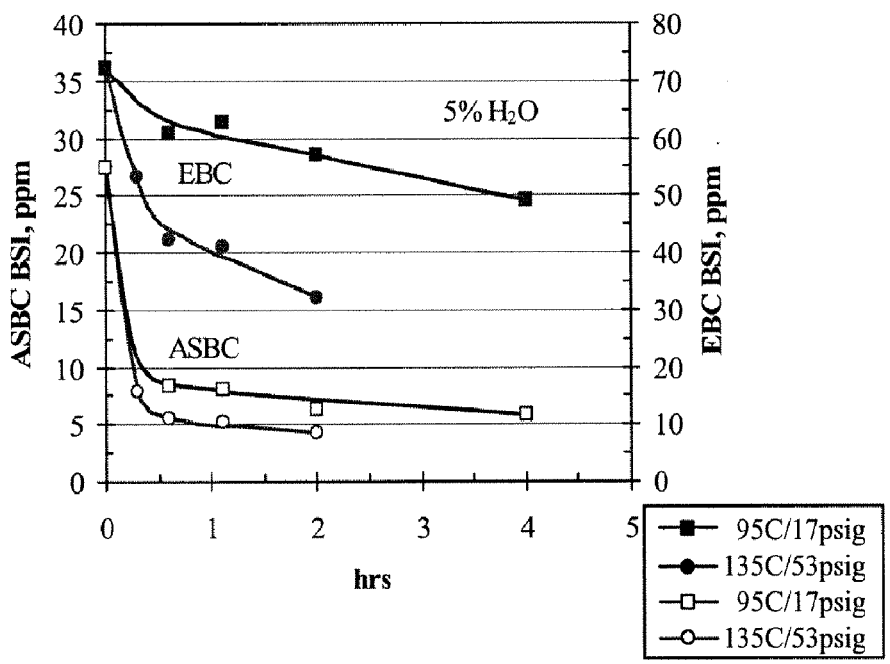
FIG. 6 shows a graph illustrating BSI reduction of Celite 3Z (Lompoc, Calif., USA) at 95° C./17 psig and 135° C./53 psig at a constant water addition of 5%.

The untreated C3Z underwent intensive water treatment in accordance with the Parr reactor method. The kinetics of ASBC BSI reduction for C3Z was quicker than the kinetics of either HYF Z or STD Z. At 95° C., the ASBC BSI was reduced from 27 ppm to 8 ppm in about 1 hour (FIG. 6). When the temperature was increased to 135° C., the reaction kinetics accelerated. For example, an ASBC BSI of about 5 ppm was reached within 40 minutes. However, EBC BSI reduction was slower. Nonetheless, an improvement in EBC BSI kinetics was observed.

Figure 7:
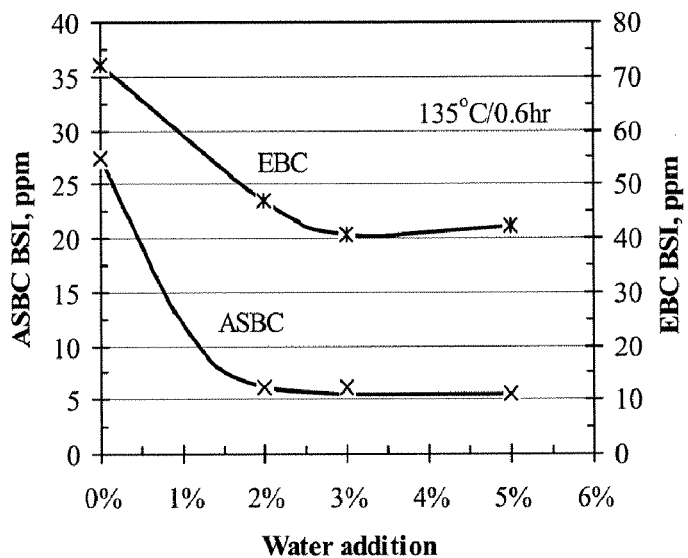
FIG. 7 shows a graph illustrating the effect of water addition on BSI reduction of Celite 3Z (Lompoc, Calif., USA).

FIG. 7 shows the effect of water addition on BSI at a constant temperature of 135° C. over a period of 0.6 hours. Although water addition did not impact BSI reduction in a similar manner as the corresponding treated samples, improvement was observed. Effective treatment could be accomplished by adding about 2% water (FIG. 7).

4. Lompoc, Calif. Standard Super-Cel and Hyflo Super-Cel

Two other samples, STD and HYF, were tested using the Parr reaction method at elevated temperatures.

Table III provides a comprehensive comparison of BSI reduction using the Parr reactor method. When measured by BSI percent reduction, the Parr reaction method was most effective for C3Z regardless of the method for measuring BSI (either ASBC or EBC BSI). In the case of ASBC BSI, C3Z was followed by the white grades, HYF and HYF Z, and then the other pink grades, STD and STD Z, in terms of the effectiveness of BSI reduction. In the case of EBC BSI, C3Z was followed by (in decreasing order) STD Z, HYF Z, HYF, and STD, in terms of the effectiveness of BSI reduction. ASBC BSI of less than 10 ppm was not reached with the two non-Z grades (STD and HYF).

TABLE III

BSI reduction by intensified water treatment - Grades comparison

| Filter aid grade | Temperature °C. | Pressure psig | Time hr | BSI, ppm | | BSI reduction, % | |
|---|---|---|---|---|---|---|---|
| | | | | ASBC | EBC | ASBC | EBC |
| LO STD Z | Before treatment | | | 12 | 57 | | |
| | 135 | 53 | 1.2 | 10 | 38 | 19 | 33 |
| | 135 | 53 | 2.0 | 7 | 27 | 38 | 53 |
| LO STD | Before treatment | | | 26 | 73 | | |
| | 135 | 53 | 1.1 | 21 | 59 | 22 | 19 |
| | 135 | 53 | 2.0 | 19 | 49 | 28 | 33 |
| LO C3Z | Before treatment | | | 27 | 72 | | |
| | 95 | 17 | 1.1 | 8 | 63 | 70 | 13 |
| | 95 | 17 | 2.0 | 6 | 57 | 77 | 21 |

TABLE III-continued

BSI reduction by intensified water treatment - Grades comparison

| Filter aid grade | Temperature °C. | Pressure psig | Time hr | BSI, ppm ASBC | BSI, ppm EBC | BSI reduction, % ASBC | BSI reduction, % EBC |
|---|---|---|---|---|---|---|---|
| | 135 | 53 | 1.1 | 5 | 41 | 81 | 43 |
| | 135 | 53 | 2.0 | 4 | 32 | 85 | 56 |
| LO HYF Z | Before treatment | | | 33 | 52 | | |
| | 125 | 40 | 1.3 | 11 | 37 | 67 | 28 |
| | 125 | 40 | 2.0 | 9 | 33 | 73 | 37 |
| LO HYF | Before treatment | | | 52 | 72 | | |
| | 125 | 40 | 1.1 | 21 | 54 | 59 | 25 |
| | 125 | 40 | 2.0 | 18 | 50 | 66 | 31 |

BSI Analyses from the Steam Sterilizer Method

Figure 8:
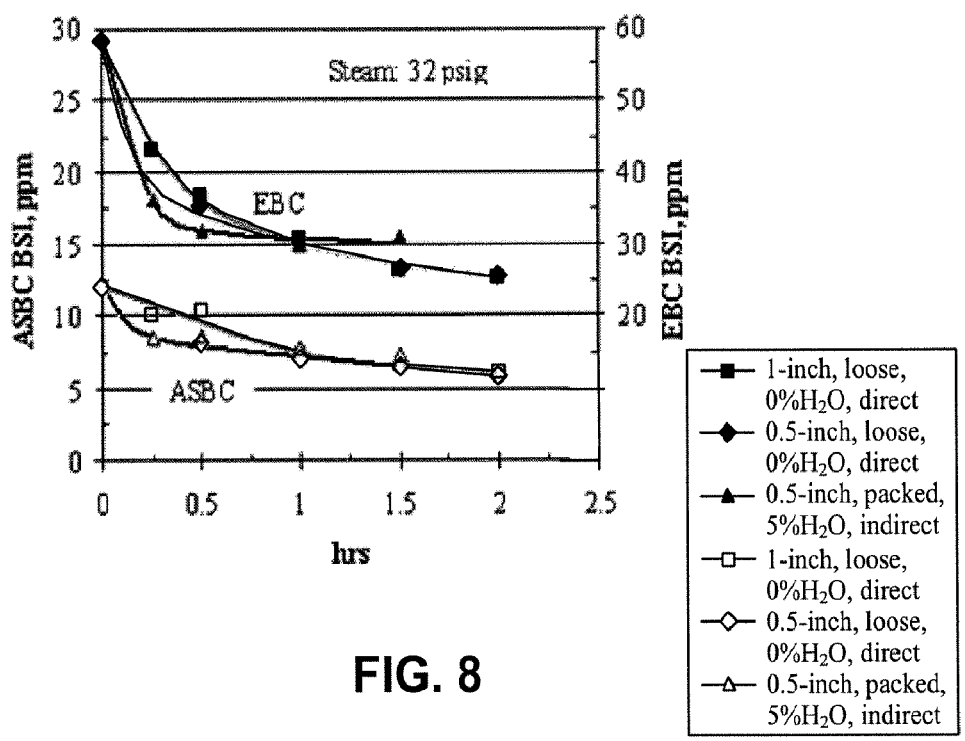
FIG. 8 shows a graph illustrating the effect of bed thickness and steam contact during steam treatment of Standard Super-Cel Z (Lompoc, Calif., USA).

Samples of STD Z and HYF Z were processed using the steam sterilizer method described above. Data produced from using the steam sterilizer are presented in FIGS. 8 and 9 and Table IV. The data show that heat transfer played a role in the kinetics of BSI reduction. For instance, when the filter aids were allowed to have direct contact with steam, a thinner layer of the diatomaceous earth sample (0.5 inches vs. 1 inch) led to faster BSI reduction and, in certain cases, lower BSI.

Figure 9:
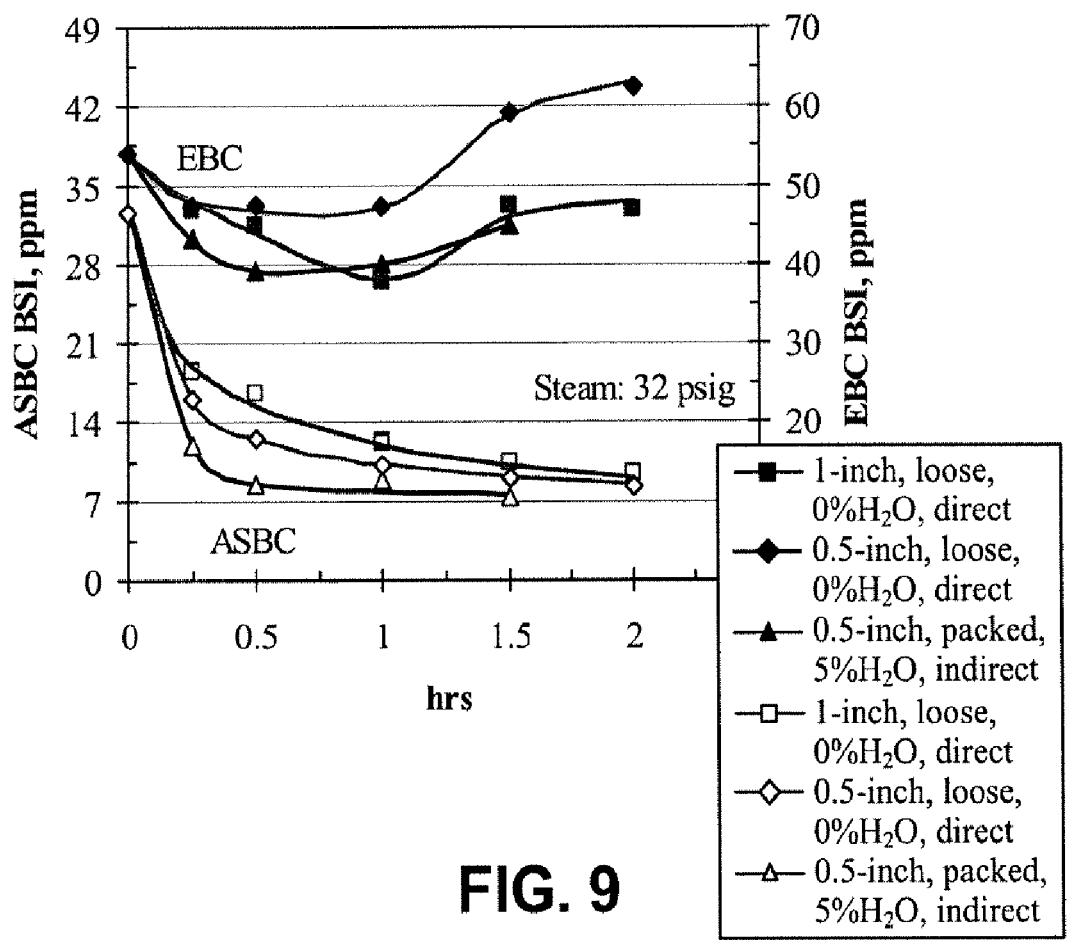
FIG. 9 shows a graph illustrating the effect of bed thickness and steam contact during steam treatment of Hyflo Super-Cel Z (Lompoc, Calif., USA).

One exception was the EBC BSI of HYF Z, where a thinner layer of the diatomaceous earth sample led to higher EBC BSI (FIG. 9).

Also examined was the role of direct steam contact. The effectiveness of BSI reduction was not decreased by indirect steam heating. Thus, it is hypothesized that direct steam contact may not be necessary for BSI reduction. See FIGS. 8 and 9. Without being limited by theory, the accelerated kinetics of BSI reduction shown in FIGS. 8 and 9 may be the result of improved heat conduction due to better contact between the particles in the compacted bed.

When steam was allowed to have direct contact with the diatomaceous earth samples, neither premixing the samples with water nor moisture adsorption from steam (>0.5%) was necessary for effective BSI reduction.

TABLE IV

BSI reduction by steam treatment - Water addition or adsorption

| Filter aid | Thickness (in) | H$_2$O added (%) | H$_2$O retained (%)* 0.5 hr | H$_2$O retained (%)* 1.0 hr | ASBC BSI (ppm) 0.5 hr | ASBC BSI (ppm) 1.0 hr | EBC BSI (ppm) 0.5 hr | EBC BSI (ppm) 1.0 hr |
|---|---|---|---|---|---|---|---|---|
| LO STD Z | 0.5 | 0 | −0.2 | 0.0 | 8 | 7 | 35 | 30 |
| | | 3 | 0.4 | 0.4 | 8 | 7 | 35 | 32 |
| | 1.0 | 0 | 0.0 | 0.0 | 10 | 7 | 37 | 30 |
| | | 1 | 0.2 | n/a | 10 | n/a | 38 | n/a |
| LO HYF Z | 0.5 | 0 | −0.4 | 0.4 | 13 | 10 | 48 | 47 |
| | | 3 | 0.4 | 0.4 | 14 | 11 | 48 | 53 |
| | 1.0 | 0 | 0.0 | 0.0 | 17 | 12 | 45 | 38 |
| | | 1 | 0.1 | n/a | 16 | n/a | 50 | n/a |

Steam pressure: 32 psig. Filter aid bed loosely packed and with direct steam contact

*Based on sample weight after the treatment.

The experimental data presented herein provides useful information on the response of diatomaceous earth to water treatment under intensified temperature and/or pressure conditions.

The kinetics of the processes are impacted by the temperatures and/or pressures of the reaction mechanism. Table V compares various water treatment methods and illustrates the acceleration of BSI reduction by improving heat transfer. Therefore, without being limited by theory, the effect of on BSI reduction of the amount of water added as shown by the Parr reactor tests (FIGS. 3, 5, and 7) may be the result of improved heat transfer brought by more water or steam acting as a heat conducting medium within the particulate bed.

Also included in Table V is a set of comparative tests wherein heating was provided by a microwave. Improved BSI reduction was not observed.

The mechanism of EBC BSI reversal by water treatment of HYF Z is unclear and not observed in other grades. Without being limited by theory, it is possible that steam at high temperatures activates certain iron species to become more soluble in the time period allowed by the 2 hour KHP extraction (EBC protocol) but not by the 9 minute BUDWEISER extraction (ASBC protocol).

TABLE V

| | Intensified water treatment - Method comparison | | | | | | |
|---|---|---|---|---|---|---|---|
| Filter aid | | $H_2O$ | Process conditions | | | BSI (ppm) | |
| grade | Heating method | (%) | °C. | psig | min | ASBC | EBC |
| LO STD Z | 2.5 inch-ID reactor in oven | 5 | 135 | 53 | 72 | 10 | 38 |
| | 0.5-inch bed, indirect steam | 5 | 135 | 32 | 30 | 9 | 32 |
| | 0.5-inch bed, direct steam | 0 | 135 | 32 | 30 | 8 | 35 |
| | 0.5-inch bed, microwave | 5 | n/a | 0 | 5 | 10 | 57 |

What is claimed is:

1. A process for decreasing the beer soluble iron content in a diatomaceous earth material comprising:
    providing a diatomaceous earth feed material; and
    subjecting the diatomaceous earth feed material to a saturated steam treatment at a temperature of at least about 100° C. in an enclosed vessel.

2. The process according to claim 1, wherein the saturated steam treatment comprises:
    mixing the diatomaceous earth feed material and water, and
    heating the diatomaceous earth feed material and water to a temperature sufficient to initiate phase transfer of at least a portion of the water into saturated steam.

3. The process according to claim 2, wherein the heating occurs at a pressure above about 30 psig.

4. The process according to claim 1, wherein the temperature ranges from about 100° C. to about 150° C.

5. The process according to claim 4, wherein the temperature ranges from about 105° C. to about 145° C.

6. The process according to claim 1, wherein the mixture of water and diatomaceous earth feed material comprises about 1% to about 5% water.

7. The process according to claim 1, wherein the diatomaceous earth feed material is heated by direct contact with saturated steam.

8. The process according to claim 1, wherein the diatomaceous earth feed material is not directly contacted with the saturated steam.

9. The process according to claim 1, wherein the diatomaceous earth feed material is mixed with water.

10. The process according to claim 1, wherein the diatomaceous earth feed material is arranged in a layer having a thickness of about 1 inch or less.

11. The process according to claim 10, wherein the layer has a thickness of about 0.5 inches or less.

* * * * *